United States Patent

Sherlock

[15] 3,681,394
[45] Aug. 1, 1972

[54] GLYCERYL-N-(SUBSTITUTED PHENYL) ANTHRANILATES

[72] Inventor: Margaret H. Sherlock, Bloomfield, N.J.

[73] Assignee: Schering Corporation, Bloomfield, N.J.

[22] Filed: Jan. 21, 1970

[21] Appl. No.: 4,767

Related U.S. Application Data

[62] Division of Ser. No. 629,382, April 10, 1967, Pat. No. 3,511,872.

[52] U.S. Cl. ............260/340.9, 260/471, 260/518, 260/519, 424/278, 424/310
[51] Int. Cl. ............................................C07d 13/04
[58] Field of Search.................................260/340.9

[56] References Cited

UNITED STATES PATENTS 3,390,172   6/1968   Scherrer......................260/518

*Primary Examiner*—Henry R. Jiles
*Assistant Examiner*—James H. Turnipseed
*Attorney*—Stephen B. Coan and Raymond A. McDonald

[57] ABSTRACT

The invention relates to glyceryl esters of N-X,Y,Z-phenyl (anthranilic acids), to their use as analgesic anti-inflammatory agents, and to the intermediates useful in the preparation thereof. Illustrative of the preparation of those compounds is the formation of glyceryl-N-(3-trifluoromethylphenyl) anthranilate, as follows: Reflux a mixture containing N-(3-trifluoromethylphenyl) anthranilic acid, chloroacetonitrile in the presence of triethylamine to produce cyanomethyl-N-(3-trifluoromethylphenyl) anthranilate which, by heating with 2,2-dimethyl-1,3-dioxolane-4-methanol in the presence of anhydrous potassium carbonate, produces $\beta$-$\gamma$-isopropylidenedioxypropyl anthranilate. Hydrolysis of the $\beta$-$\gamma$-isopropylidenedioxypropyl-N-(3-trifluoromethylphenyl) anthranilate with 75 percent acetic acid for 35 minutes yields glyceryl N-(3-trifluoromethylphenyl) anthranilate. Alternate methods for the preparation of the glyceryl esters of N-(X,Y,Z-phenyl) anthranilic acids are also described.

7 Claims, No Drawings

GLYCERYL-N-(SUBSTITUTED PHENYL) ANTHRANILATES

This application is a divisional application of our copending application, Ser. No. 629,382, filed Apr. 10, 1967 now U.S. Pat. No. 3,511,872, issued May 12, 1971.

FIELD OF INVENTION

This invention relates to compositions of matter identifiable in the art of chemistry and glyceryl esters of N-phenyl-anthranilic acids, to the processes and intermediates useful for the preparation thereof, and to the therapeutic use of such compositions.

SUMMARY OF INVENTION

The invention sought to be patented in one of its composition of matter aspects is described as residing in the concept of a chemical compound having the molecular structure of a glyceryl ester of an N-(X,Y,Z-phenyl) anthranilic acid, wherein X is a member of the group consisting of lower alkyl, lower alkoxy, nitro, halogeno, trifluoromethyl, and Y is a member of the group consisting of halogeno, lower alkyl, trifluoromethyl and hydrogen, and Z is a member of the group consisting of hydrogen, halogeno, trifluoromethyl, lower alkyl, and nitro.

The invention sought to be patented in another of its composition aspects resides in the concept of pharmaceutical dosage forms containing a novel compound of this invention.

The invention sought to be patented in one of its process aspects is described as residing in the concept of subjecting a reactive ester of an approximately N-(X,Y,Z-phenyl) anthranilic acid to a transesterification reaction which, depending upon the alcohol employed, will produce either the glyceryl ester directly, or will produce an intermediate which, upon hydrolysis, is convertible thereinto.

In another of its process aspects this invention relates to the process wherein an anhydride of an N-(X,Y,Z,-phenyl) anthranilic acid is reacted with glycerol, or a cyclic acetal thereof, to produce the desired compound of this invention or a compound which, upon hydrolysis, produces the desired compound of this invention, respectively.

In still another process aspect, this invention relates to the process wherein an alkyl isourea is reacted with an N-(X,Y,Z,-phenyl) anthranilic acid to form an alkylidenedioxypropyl ester of the N-(X,Y,Z-phenyl) anthranilic acid which, upon hydrolysis, produces the desired compound of this invention.

The invention sought to be patented in its method-of-use aspect is described as residing in the concept of treating fever and alleviating inflammation and inflammatory conditions by administering a therapeutically effective quantity of a novel compound of this invention. Another aspect is that wherein a novel compound of this invention is used to cause an analgesic effect. Still another use aspect is that wherein a novel compound of this invention is used to cause an antipyretic effect. Another use aspect of this invention is the use of compositions which, in addition to the novel compounds of this invention, contain other active ingredients to provide desirable complementary effects when employed in the treatment of inflammatory conditions and in the treatment of pain.

DESCRIPTION OF THE PREFERRED EMBODIMENTS

A more specific representation of the tangible embodiments of this invention are the chemical compositions of matter having the structural formula:

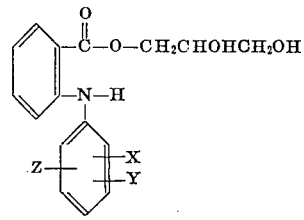

and the pharmaceutically acceptable acid addition salts thereof, wherein X is a member of the group consisting of lower alkyl, lower alkoxy, halogen, nitro, trifluoromethyl, Y is a member of the group consisting of lower alkyl, halogeno, trifluoromethyl, nitro, and hydrogen, and Z is a member of the group consisting of hydrogen, halogeno, trifluoromethyl, lower alkyl, and nitro.

The desired glyceryl esters of this invention (I) may be prepared from any one of several different routes of synthesis, the choice being determined by the ready availability of the required starting compounds. Preferentially the desired compounds are prepared by the hydrolysis of an ester-interchange reaction product, said reaction product being formed by the transesterification of a reactive ester of an N-(X,Y,Z-substituted phenyl)-anthranilic acid with a cyclic acetal of glycerol. The transesterification reaction is generally effected by heating the reactive ester of the appropriately substituted N-(X,Y,Z-phenyl) anthranilic acid with a cyclic acetal of glycerol in the presence of catalytic amounts of an anhydrous alkaline catalyst, such as potassium carbonate, at temperatures in the range of 80°–250° C, although it is preferred to heat the reactants at about 100° C. As the ester interchange is reversible it is preferred to employ large excess quantities of the cyclic acetal. The reaction may also be effected in high boiling reaction-inert solvents although, due to the excess quantities of the cyclic acetal reactant, a separate solvent is generally not required. The hydrolysis of the β-γ-alkylidenedioxypropyl product to the desired glyceryl-N-(X,Y,Z-phenyl) anthranilate is effected by standard techniques, such as by heating the intermediates in the presence of an acid, preferably acetic acid. Representative of such techniques are the hydrolysis of the ester (IV) in acetone with p-toluenesulfonic acid at room temperature; hydrolysis of the ester (IV) in dioxane at room temperature for 3 hours, and hydrolysis of the ester (IV) in sodium acetate with acetic acid at 80° C for up to one-half hour. The resulting products are isolated by filtration.

In practice, it is preferred to employ cyanomethyl esters of the N-(X,Y,Z-phenyl) anthranilic acids, although other equivalently functioning reactive esters may also be employed. Among such equivalently functioning esters are those R'-COOCH$_2$R esters wherein R is acyl, carbamyl, acyloxy, carbalkoxy and the like, and R' is the remaining moiety of the N-(X,Y,Z-phenyl) anthranilate.

The foregoing reaction scheme may be depicted as follows:

REACTION SCHEME A

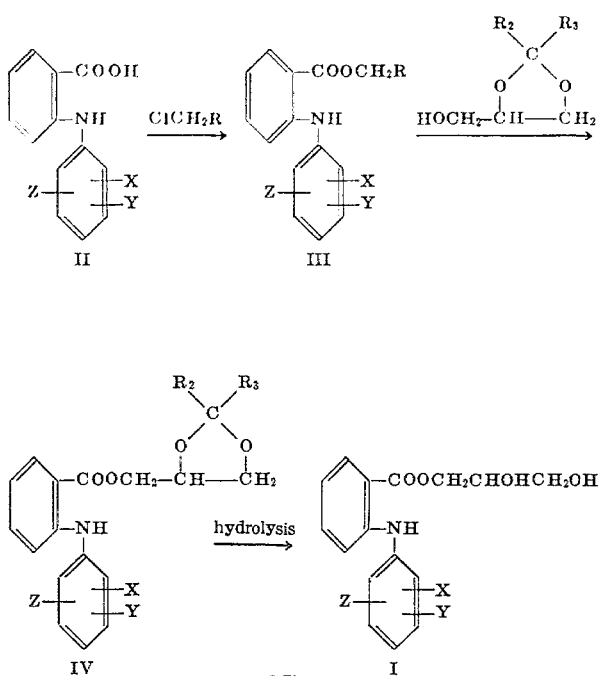

wherein X, Y, Z and R are as previously defined, and $R_2$ and $R_3$ are lower alkyl radicals. Representative of those compounds embraced by formula II are chloroacetonitrile, chloroacetone, α-chloroacetamide, chloroacetophenone and ethylchloroacetate, respectively.

The intermediary reactive esters (III) may be prepared by standard techniques such as by reacting the appropriate N-(X,Y,Z-phenyl) anthranilic acid with chloroacetonitrile by heating the reaction mixture at about its reflux temperature in the presence of triethylamine; optionally, a reactive ester of 2-chlorobenzoic acid may be condensed with an appropriately X,Y,Z-substituted aniline according to known techniques to produce the desired reactive ester (III).

Preferably, the compounds are prepared by heating an alkali metal (preferably sodium) salt of 2-chlorobenzoic acid or 2-bromobenzoic acid with the appropriate X,Y,Z-substituted aniline, said heating taking place in a high boiling solvent such as a high boiling alcohol (e.g. t-amyl alcohol), preferably in the presence of copper powder.

Alternatively, the glyceryl-N-(X,Y,Z-phenyl) anthranilates (I) may be prepared by esterification of the appropriate N-phenyl anthranilic acid with glycerol, or by a transesterification of a reactive ester of the appropriate N-(X,Y,Z-phenyl) anthranilic acid with glycerol.

Alternatively, the desired glyceryl-N-(X,Y,Z-phenyl)-anthranilates (I) may be prepared by transesterifying the reactive esters of N-(X,Y,Z-phenyl)-anthranilic acid with glycerol.

Alternatively, another method for the preparation of the desired compounds of this invention is the preparation wherein, in the presence of pyridine, an appropriate carbodiimide is reacted with an N-(X,Y,Z-phenyl) anthranilic acid to form an isoureayl-N-(X,Y,Z-phenyl) anthranilate, which ester is then reacted with glycerol to produce the desired products or else they may be reacted with a cyclic acetal of glycerol to form an alkylidenedioxypropyl-N-(X,Y,Z-phenyl)-anthranilate which, upon hydrolysis, produces the desired compound. In effecting the formation of the isoureayl-N-(X,Y,Z-phenyl)-anthranilate, equimolar quantities of the reactants are stirred at below room temperatures, preferably at 0° C, using pyridine as a base solvent, although other equivalently functioning bases may also be used. It is preferred to employ N,N'-dicyclohexylcarbodiimide, although other equivalently functioning carbodiimides may also be employed. The ester interchange reaction of the so-formed isourenyl-N-(X,Y,Z-pheny)-anthranilate with glycerol, or a cyclic acetal thereof, is effected according to standard techniques well known in the art.

The compounds contemplated as falling within formula I are weakly basic in character and form acid addition salts with acids. Accordingly, the pharmaceutically acceptable acid addition salts to the free bases are contemplated as being within the concept in its composition aspect. Such salts include those derived from maleic, salicylic, succinic, methyl sulfonic, tartaric, citric, hydrochloric, hydrobromic, sulfuric, phosphoric and the like.

The following examples are illustrative of the methods of synthesis of the tangible embodiments of this invention:

A. PREPARATION OF THE REACTIVE ESTERS

Example I

Cyanomethyl N-(3-trifluoromethylphenyl)-anthranilate 1¼

A mixture of 15 g. of N-(3-trifluoromethylphenyl)-anthranilic acid, 45 ml. of triethylamine and 9 ml. of chloroacetonitrile is stirred and heated on a steam bath for 1-½ hours. The resulting reaction mixture is poured into water and the product filtered. The so-obtained colorless product melts at 116°–117° after recrystallization from isopropyl ether.

In a similar manner by substituting the N-3-trifluoromethylphenyl reactant of this example with equivalent quantities of N-(2-methyl-3-chlorophenyl)-anthranilic acid; N-(2-methyl-3-nitrophenyl)-anthranilic acid; N-(2-methyl-3-chloro-6-nitrophenyl)-anthranilic acid; N-(2-chloro-6-nitrophenyl)-anthranilic acid; N-(2,3-dimethylphenyl)-anthranilic acid; N-(2,3-dichlorophenyl)-anthranilic acid; N-(2,3-dibromophenyl)-anthranilic acid; N-(2,6-dimethyl-3-nitrophenyl)-anthranilic acid; N-(2,3-dichloro-6-methylphenyl)-anthranilic acid; N-(2,3-dichloro-6-nitrophenyl)-anthranilic acid; N-(3-methyl-5,6-dichlorophenyl) acid; N-(3-methyl-5-chlorophenyl)-anthranilic acid; N-(3-methyl-5-bromophenyl)-anthranilic acid; N-(3-methyl-5-nitrophenyl)-anthranilic acid; N-(3,5-dichlorophenyl)-anthranilic acid; N-(3,5-dimethylphenyl)-anthranilic acid; N-(2-methyl-3-trifluoromethylphenyl)-anthranilic acid, N-(2,6-dichlorophenyl)-anthranilic acid, and N-(2,6-dichloro-3-methylphenyl)-anthranilic acid, and by substantially following the procedures set forth in this example, there is produced cyanomethyl-N-(2-methyl-3-chlorophenyl)-anthranilate; cyanomethyl-N-(2-methyl-3-nitrophenyl)-anthranilate; cyanomethyl-N-(2-methyl-3-chloro-6-nitrophenyl)-anthranilate; cyanomethyl-N-(2-chloro-6-nitrophenyl)-anthranilate; cyanomethyl-N-(2,3-dimethylphenyl)-anthranilate; cyanomethyl-N-(2,3-dichlorophenyl)-anthranilate; cyanomethyl-N-(2,3-dibromophenyl)-anthranilate; cyanomethyl-N-(2,6-dimethyl-3-nitrophenyl)-anthranilate; cyanomethyl-N-(2,3-dichloro-6-methylphenyl)-anthranilate; cyanomethyl-N-(2,3-dichloro-6-nitrophenyl)-anthranilate; cyanomethyl-N-(3-methyl-5,6-dichlorophenyl)-anthranilate; cyanomethyl-N-(3-methyl-5-chlorophenyl)-anthranilate; cyanomethyl-N-(3-methyl-5-bromophenyl)-anthranilate; cyanomethyl-N-(3-methyl-5-nitrophenyl)-anthranilate; cyanomethyl-N-(3,5-dichlorophenyl)-anthranilate; cyanomethyl-N-(3,5-dimethylphenyl)-anthranilate; cyanomethyl-N-(2-methyl-3-trifluoromethylphenyl)-anthranilate; cyanomethyl-N-(2,6-dichlorophenyl)-anthranilic acid, and cyanomethyl-N-(2,6-dichloro-3-methylphenyl)-anthranilic acid, respectively.

B. ESTER INTERCHANGE REACTION

Example 2

β-γ-isopropylidenedioxypropyl-N-(3-trifluoromethylphenyl)-anthranilate

A mixture of 11 g. of cyanomethyl-N-(m-trifluoromethyl)-phenyl)-anthranilate, 32 g. of 2,2-dimethyl-1,3-dioxolane-4-methanol and 600 mg. of anhydrous potassium carbonate is heated on a steam bath for 1 hour. The resulting reaction mixture is poured into 500 ml. of water, extracted with ether and the ether layer washed with water several times. The ether extract is dried and concentrated leaving the product as a pale yellow oil.

Similarly, by replacing the cyanomethyl-N-(3-trifluoromethyl)-anthranilate with equivalent quantities of those esters following Example 1, and by substantially following the procedure of this example, there is produced β-γ-isopropylidenedioxypropyl-N-(2-methyl-3-chlorophenyl)-anthranilate; lidenedioxypropyl-N-(2-methyl-3-nitrophenyl)-anthranilate; β-γ-isopropylidenedioxypropyl-N-(2-methyl-3-chlorophenyl)-anthranilate; β-γ-isopropylidenedioxypropyl-N-(2-methyl-3-nitrophenyl)-anthranilate; β-γ-isopropylidenedioxypropyl-N-(2-methyl-3-chloro-6-nitrophenyl)-anthranilate; β-γ-lidenedixoypropyl-N-(2,3-dichlorophenyl)-anthranilate; β-γ-isopropylidenedioxypropyl-N-(2,3-dibromophenyl)-anthranilate; β-γ-isopropylidenedioxypropyl-N-(2,6-dimethyl-3-nitrophenyl)-anthranilate; β-γ-isoropylidenedioxypropyl-N-(2,3-dichloro-6-methylphenyl)-anthranilate; β-γ-isopropylidenedioxypropyl-N-(2,3-dichloro-6-nitrophenyl)-anthranilate; β-γ-isopropylidenedioxypropyl-N-(3-methyl-5,6-dichlorophenyl)-anthranilate; β-γ-isopropylidenedioxypropyl-N-(3-methyl-5-chlorophenyl)-anthranilate; β-γ-isopropylidenedioxypropyl-N-(3-methyl-5-bromophenyl)-anthranilate; β-γ-isopropylidenedioxypropyl-N-(3-methyl-5-nitrophenyl)-anthranilate; β-γ-isopropylidenedioxypropyl-N-(3,5-dichlorophenyl)-anthranilate; β-γ-isopropylidenedioxypropyl-N-(3,5-dimethylphenyl)-anthranilate; β-γ-isopropylidenedioxypropyl-N-(2-methyl-3-trifluoromethylphenyl)-anthranilate; β-γ-isopropylidenedioxypropyl-N-(2,6-dichlorophenyl)-anthranilate; and β-γ-isopropylidenedioxypropyl-N-(2,6-dichloro-3-methylphenyl)-anthranilate, respectively.

C. PREPARATION OF GLYCERYL ESTERS

Example 3

Glyceryl-N-(3-trifluoromethylphenyl)-anthranilate

A solution of 12.6 g. of β-γ-isopropylidenedioxypropyl-N-(m-trifluoromethylphenyl)-anthranilate and 90 ml. of 75 percent acetic acid is heated for 30 minutes on a steam bath. The solution is poured on ice, neutralized with cold dilute sodium hydroxide solution, extracted with ether and the ether layer separated, dried and concentrated. Crystallization from benzene-hexane yields the product as a colorless solid, m.p. 94°–95.

In similar manner, by substituting β-γ-isopropylidenedioxypropyl-N-(3-trifluoromethylphenyl)-anthranilate with equivalent quantities of those β-γ-isopropylidenedioxypropyl esters following Example 2, and by substantially following the procedure of this example, there is produced glyceryl-N-(2-methyl-3-chlorophenyl)-anthranilate; glyceryl-N-(2-methyl-3-nitrophenyl)-anthranilate; glyceryl-N-(2-methyl-3-chloro-6-nitrophenyl)-anthranilate; glyceryl-N-(2-chloro-6-nitrophenyl)-anthranilate; glyceryl-N-(2,3-dimethylphenyl)-anthranilate; glyceryl-N-(2,3-dichlorophenyl)-anthranilate; glyceryl-N-(2,3-dibromophenyl)-anthranilate; glyceryl-N-(2,6-dimethyl-3-nitrophenyl)-anthranilate; glyceryl-N-(2,3-dichloro-6-methylphenyl)-anthranilate; glyceryl-N-(2,3-dichloro-6-nitrophenyl)-anthranilate; glyceryl-N-(3-methyl-5,6-dichlorophenyl)- glyceryl-N-(3-methyl-5-chlorophenyl)-anthranilate; glyceryl-N-(3-methyl-5-bromophenyl)-anthranilate; glyceryl-N-(3-methyl-5-nitrophenyl)-anthranilate; glyceryl-N-(3,5-dichlorophenyl)-anthranilate; glyceryl-N-(3,5-dimethylphenyl)-anthranilate glyceryl-N-(2-methyl-3-trifluoromethylphenyl)-anthranilate; glyceryl-N-(2,6-dichlorophenyl)-anthranilate, and glyceryl-N-(2,6-dichloro-3-methylphenyl)-anthranilate, respectively.

The tangible embodiments of this invention possess the inherent applied use characteristics of exerting an anti-inflammatory response as determined by pharmacological evaluation, and also exert analgesic and anti-pyretic actions. Thus, they are useful in treating fever, inflammation and in treating certain symptoms of pain.

The treatment of inflammation with concomitant absence of side effects induced by the anti-inflammatory agent has been a goal long-sought. Until recently, steroids having cortisone-like activity had been employed for the treatment of inflammation. However, the use of steroids had the drawback of exhibiting side effects such as electrolyte imbalance, water retention and the like. Recently certain anthranilic acids have been discovered to be effective anti-inflammatory agents, said agents being rather specific in their action as well as being free from the side effects due to steroid therapy. However, it has also been found that these anthranilic acid anti-inflammatory agents exhibit deleterious side effects such as for example, ulceration of the gastrointestinal tract, as well as possessing an extremely bitter taste upon oral administration. Thus, although these anthranilic acids represented an improvement over steroid therapy, they themselves were not free from undesirable attributes. In an attempt to overcome some of the drawbacks to the use of these anthranilic acids, the usual salts, esters and other derivatives were made. These derivatives however did not effectively eliminate the drawbacks; indeed, in most instances they proved to be less potent in their anti-inflammatory, antipyretic and analgesic effects.

By the employment of standard laboratory techniques it is to be found that the glyceryl-anthranilates of this invention have exhibited a marked lessening of the ulcerogenic effect upon the gastrointestinal tract and at the same time they have not exhibited any significant decrease in their anti-inflammatory or antipyretic effects, nor has the glycerylation lowered the effectiveness of the compounds in their analgesic effects. Thus, the compounds of this invention have significantly enhanced the functional-use indices of the anthranilic acid class of compounds in the treatment of pain and inflammatory conditions.

In practice, based upon standard pharmacological animal studies, particularly in the rat, it has been found that chronic administration of daily doses of 30–180 mg. of the compounds of this invention per kg. of animal body weight will elicit the desired anti-inflammatory-analgesic effect without producing significant ulcerogenic effects, and that short-term administration for acute conditions, the daily dosage is in the range of about 30–250 mg./kg. of animal body weight. As expected, it is also to be found that in the treatment of larger animals, such as the dog, the daily oral dosage is about 20–180 mg./kg. of body weight, whereas with still larger animals such as those mammals having an adult body weight of about 70 kg., the daily oral dosage is about 15–180 mg. per kg. of body weight. Of course, in all instances the optimum daily oral dosage level useful in the control of arthritic and other herein described conditions will vary depending upon the activity of the specific compound and the severity of the condition being treated and the reaction sensitivity of the patient. It is also to be found that significantly smaller doses may be administered when it is desired to effect only analgesic effects.

It is also to be noted that the glyceryl esters of this invention have also significantly increased the water solubility characteristics over that of the prior art compounds and at the same time have unexpectedly lessened the bitter taste characteristic. Thus, the glyceryl anthranilates of this invention are useful in treating fever, and in treating pain and inflammation, especially that associated with rheumatoid and osteoporoses, joint disease, collagen diseases, bursitis, gouty arthritis, spondylitis and the like.

As is true for most classes of therapeutically useful compounds, certain sub-classes and certain specific compounds are found to be more effective than other members of the general class. Of the glyceryl-N-phenyl-anthranilates of this invention, it is found that those compounds having di-substitution in the anilino portion of the molecule are most effective. For example, with the exception of glyceryl-N-(3-trifluoromethylanilino)-anthranilate; those monosubstituted compounds are of marginal interest. Of the disubstituted compounds, it is found that those having substituents in either the 2- and 3-positions, or the 3- and 5- positions of the phenyl ring of the molecule are most preferred; other preferred compounds are the glyceryl-N-(2,3-trisubstituted phenyl)-anthranilates and the glyceryl-N-(3,5,6-trisubstituted phenyl)-anthranilates. Representative of the preferred compounds of this invention are: glyceryl-N-(3-trifluoromethylphenyl)-anthranilate; glyceryl-N-(2-methyl-3-chlorophenyl)-anthranilate; glyceryl-N-(2-methyl-3-nitrophenyl)-anthranilate; glyceryl-N-(2,3-dichlorophenyl)-anthranilate; glyceryl-N-(2,3-dimethylphenyl)-anthranilate; glyceryl-N-(3-methyl-5-chloromethylphenyl)-anthranilate; glyceryl-N-(3-methyl-5-nitrophenyl)-anthranilate; glyceryl-N-(3,5-dichlorophenyl)-anthranilate; glyceryl-N-(2-methyl-3-chloro-6-nitro)-anthranilate; glyceryl-N-(2,3-dichloro-6-nitrophenyl)-anthranilate; glyceryl-N-(2,3-dimethyl-6-nitrophenyl)-anthranilate; glyceryl-N-(2-chloro-6-nitrophenyl)-anthranilate; glyceryl-N-(2,6-dimethyl-6-nitrophenyl)-anthranilate; glyceryl-N-(2,5-dichloro-6-nitrophenyl)-anthranilate.

It has also been found that the $\beta$-$\gamma$-aklylidenedioxypropyl-N-(X,Y,Z-phenyl)-anthranilate intermediates (i.e., those embraced by formula IV and are prepared via the method of Example IV) also exhibit significant anti-inflammatory-analgesic effects and therefore, although these compounds are of somewhat lesser potency than their hydrolysis products, they are also therapeutically useful in the treatment of pain and inflammation, as well as being useful as chemical intermediates.

The compositions described herein may be administered parenterally or enterally by incorporating them into dosage forms such as tablets, capsules, elixirs, solutions, suspensions and the like. Representative embodiments of the formulations containing the compositions of this invention are as follows:

TABLET FORMULATION

I. Formula and Method of Manufacture for glyceryl-N-(3-tri-fluoromethylphenyl)-anthranilate.

| Enteric Coated Tablets Formula | | mg/core |
|---|---|---|
| Glyceryl-N-(3-trifluoromethylphenyl) anthranilate, micronized | | 100.0 |
| Citric Acid | | 1.0 |
| Lactose, USP | | 33.5 |
| Dicalcium Phosphate | | 70.0 |
| Pluronic F–68 | | 30.0 |
| Sodium Lauryl Sulfate | | 15.0 |
| Polyvinylpyrrolidone | | 15.0 |
| Carbowax 1500 | | 4.5 |
| Carbowax 6000 | | 45.0 |
| 3A Alcohol | 50 ml/1000 cores | |
| Corn Starch Dry | | 30.0 |
| Sodium Lauryl Sulfate | | 3.0 |
| Magnesium Stearate | | 3.0 |
| | Tablet Weight | 350.0 |

Procedure

The glyceryl-N-(3-trifluoromethylphenyl)-anthranilate is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, carbowax 1,500 and 6,000. Add additional alcohol, if necessary, to bring powders to a pasty mass. Add corn starch and continue mixing until uniform granules are formed. Pass through a No. 10 screen, tray and dry in oven at 100° C for 12–14 hours. Reduce dried granulation through a No. 16 screen add sodium lauryl sulfate and magnesium sulfate, mix and compress into desired shape on a tablet machine.

Pluronic F-68 is a U.S. registered trademark for a non-ionic surface-active agent prepared by the addition of ethylene oxide to a polypropylene glycol which has a molecular weight of 1,750.

Coating

The above cores are treated with a lacquer and dusted with talc to prevent moisture adsorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

II. Capsule Formulations

| Formula | mg/capsule |
|---|---|
| Glyceryl-N-(3-trifluoromethyl-phenyl) anthranilate, micronized | 100.00 |
| Citric Acid | 1.00 |
| Pluronic, F-68 | 40.00 |
| Sodium Lauryl Sulfate | 20.00 |
| Lactose | 238.00 |
| Magnesium Stearate | 101.00 |
| Total: | 400.00 |

Procedure

Mix together glyceryl-N-(3-trifluoromethylphenyl)-anthranilate, citric acid, pluronic, sodium lauryl sulfate and lactose. Pass through a No. 80 screen. Add magnesium stearate, mix and encapsulate into the proper size 2 piece gelatin capsule.

III. Oral Suspension

| Formula | mg/5 ml |
|---|---|
| Glyceryl-N-(3-trifluoromethylphenyl) anthranilate, micronized | 100.0 |
| Veegum, Vanderbilt | 50.0 |
| Standard Granulated Sugar, USP | 2500.0 |
| Sorbitol Solution, USP | 1250.0 |
| Sodium Saccharin, NF | 50.0 |
| Sodium Benzoate, USP | 5.0 |
| Ethanol, USP | 0.025 ml |
| Menthol, USP | 1.000 |
| Flavor q.s. | |
| Purified Water, USP, to make | 5 ml |

Method of Preparation

Dissolve the sodium saccharin, sodium benzoate, standard granulated sugar and sorbitol solution in approximately 80 percent of the required amount of water. Disperse the Veegum in approximately 5 percent of the required amount of water and add the dispersion to the previously prepared syrup. Prepare a slurry of the glyceryl-N-(3-trifluoromethylphenyl) anthranilate with approximately 10 percent of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

IV. Suppository

| Formula | mg/2 gms |
|---|---|
| Glyceryl-N-(3-trifluoromethylphenyl) anthranilate, microniced | 100 |
| Theobroma Oil, Pharm. Grade to make | 2 gms |

Method of Preparation

Prepare a slurry of the glyceryl-N-(3-trifluoromethylphenyl) anthranilate with a portion of the melted theobroma oil and pass the slurry through a suitable colloid mill until it is free of grittiness. Add sufficient melted theobroma oil to bring the batch to final weight. Pour the melted mix, while maintaining uniformity, into appropriately prepared molds and allow to cool.

V. Topical Ointment

| Formula | mg/gm |
|---|---|
| Glyceryl-N-(3-trifluoromethylphenyl) anthranilate, micronized | 20.0 |
| Methylparaben, USP | 0.5 |
| Propylparaben, USP | 0.1 |
| Petrolatum, USP to make | 1 gm |

Method of Manufacture

Dissolve the parabens in the melted petrolatum. Prepare a slurry of the glyceryl-N-(3-trifluoromethylphenyl) anthranilate with a portion of the paraben solution. Pass the slurry through a suitable colloid mill until free of grittiness. Add the slurry to the remainder of the paraben solution and mix while cooling to room temperature.

I claim:

1. A compound of the group having the structural formula:

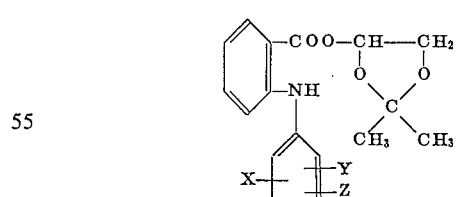

wherein X is a member of the group consisting of methyl, methoxy, chloro, bromo, nitro and trifluoromethyl, Y is a member of the group consisting of methyl, chloro, bromo, trifluoromethyl, nitro and hydrogen and Z is a member of the group consisting of hydrogen, chloro, bromo, trifluoromethyl, methyl and nitro.

2. A compound of claim 1 wherein Y and Z are hydrogen and X is trifluoromethyl.

3. A compound of claim 1 wherein Y is hydrogen, X is methyl and Z is chloro.

4. A compound of claim 1 wherein Y is hydrogen, X is methyl and Z is nitro.

5. A compound of claim 1 wherein Y and Z are hydrogen, X is trifluoromethyl, said compound being β,γ-isopropylidenedioxypropyl-N-(3-trifluoromethylphenyl) anthranilate.

6. A compound of claim 1 wherein Y is hydrogen, X is methyl, Z is chloro, said compound being β,γ-isopropylidenedioxypropyl-N-(2-methyl-3-chlorophenyl) anthranilate.

7. A compound of claim 1 wherein Y is hydrogen, X is methyl, Z is nitro, said compound being β,γ-isopropylidenedioxypropyl-N-(2-methyl-3-nitrophenyl) anthranilate.

* * * * *